United States Patent

Zimmermann et al.

[15] 3,678,913
[45] July 25, 1972

[54] CURRENT GENERATOR AND ELECTRONIC IGNITION CIRCUIT

[72] Inventors: Kurt Zimmermann, Boblingen; Georg Gemander, Nurnberg, both of Germany

[73] Assignee: Robert Bosch GmbH, Stuttgart, Germany

[22] Filed: July 2, 1970

[21] Appl. No.: 51,767

[30] Foreign Application Priority Data

July 25, 1969  Germany ............ P 19 37 827.9

[52] U.S. Cl. ................................. 123/149 D, 123/148 E
[51] Int. Cl. ............................................. F02p 3/06
[58] Field of Search ............ 123/148 E, 149, 149 D; 310/8.1; 315/209

[56] References Cited

UNITED STATES PATENTS

| | | |
|---|---|---|
| 3,465,739 | 9/1969 | Burson ........................ 123/148 E X |
| 3,517,655 | 6/1970 | Jaulmes ....................... 123/148 E |
| 3,496,920 | 2/1970 | Shano et al. ................. 123/148 E |
| 3,324,841 | 6/1967 | Kebbon et al. .............. 123/149 |
| 3,495,579 | 2/1970 | Davalillo ..................... 123/149 |

*Primary Examiner*—Laurence M. Goodridge
*Attorney*—Michael S. Striker

[57] ABSTRACT

Generator comprises a stator with armature and charge windings on its outer circumference and at least one control winding on its inner circumference, and a rotor with magnets of alternating polarity for inducing currents into the armature and charge windings. The rotor hub has a magnet for inducing a control voltage across the control winding, which voltage operates a thyristor for controlling the discharge of a capacitor charged by the charge winding, the capacitor discharging through the primary of a spark coil.

13 Claims, 4 Drawing Figures

Patented July 25, 1972 3,678,913

INVENTORS
Kurt ZIMMERMANN
Georg GEMANDER

By their ATTORNEY

CURRENT GENERATOR AND ELECTRONIC IGNITION CIRCUIT

BACKGROUND OF THE INVENTION

The invention relates to a current generator and to the associated ignition circuitry, for a motor vehicle having an internal combustion engine that uses one or more spark plugs.

Prior art current generators for this use frequently have an annular stator composed of a magnetically conductive material and incorporating radially extending teeth that carry an armature winding for powering current consuming equipment on the vehicle. The generator also comprises an engine driven rotor of magnetically conductive material. The rotor mounts magnets of which the poles facing the armature winding are alternately N and S.

Generators of this kind have the advantage that although they are small in size they have a relatively high power output.

SUMMARY OF THE INVENTION

An object of the invention is an improved generator of the aforesaid kind, which in a simple and advantageous manner can also be used to supply electrical energy for the electronic ignition system.

The invention broadly consists, in a motor vehicle having an internal combustion engine with at least one spark plug, of an electric current generator comprising an annular stator consisting at least in part of magnetically conductive material and having a first and second group of radially outwardly extending projections each including at least one projection, an engine-driven rotor consisting at least in part of magnetically conductive material and adjacent to said stator, first and second winding means respectively provided on said first and second groups of projections, a plurality of magnets provided on said rotor and arranged to travel past said winding means in response to rotation of the rotor, alternate magnets having opposite poles adjacent to said winding means, whereby a current is induced in said first and second winding means when said rotor moves, capacitor means connected in circuit with one of the winding means to be charged thereby, voltage actuated electronic switch means, such as a thyristor, spark plug firing spark coil means including primary winding means and secondary winding means arranged to furnish high voltage pulses in response to closing of the switch means, said switch means and said primary winding means being connected in series across the capacitor means, means for periodically closing the switch means including control winding means in the stator, auxiliary magnet means rotating with the rotor and arranged to travel past the control winding means to induce a voltage thereacross for closing the switch means, and at least one consumer of electrical energy connectable with the other of said first and second winding means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
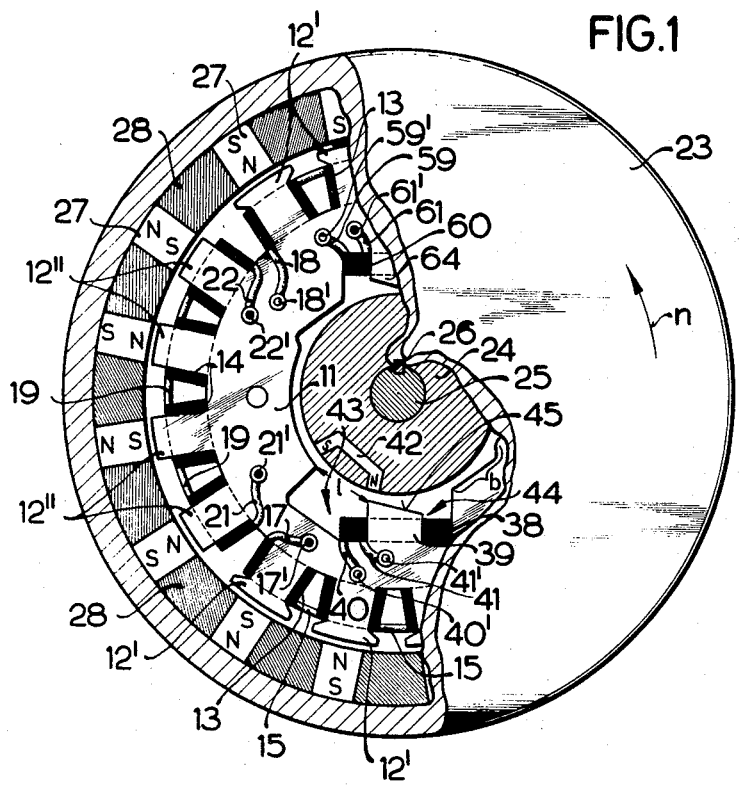
FIG. 1 is an end-on view of the current generator of the invention, with the rotor partly cut away.

The electric current generator shown in FIG. 1 is intended for an internal combustion engine that drives a motor vehicle. The generator has an annular stator 11 composed of a magnetically conductive material. The outer circumference of the stator has radially extending armature teeth, or projections, 12' and 12'', of which the teeth 12' carry spool-like individual windings 13 and the teeth 12'' similar windings 14. The individual windings 13 are connected in series by connectors 15 and their sum constitutes the armature winding 16, shown also in FIG. 2. The two ends 17 and 18 of this winding are provided with suitable connecting terminals 17' and 18'. Connectors 19 connect together in series the individual windings 14 to form a charge winding 20, of which the two ends 21 and 22 have terminals 21' and 22'.

In the embodiment illustrated, each of four armature teeth 12'' carry an individual part-winding 14 of the complete charge winding 20. In accordance with the invention, the entire winding 20 can consist of a single winding 14 on a single tooth 12''.

A hub 24 fixed to the generator rotor 23 supports the latter for rotation by the engine crankshaft 25. A key 26 prevents relative rotation between the crankshaft and the hub. Mounted on the rotor 23 are a series of magnets 27, of which the ends neighboring the armature teeth 12' and 12'' are alternately north and south poles. To ensure that the magnets are well fixed to the rotor, the spaces 28 between them can be filled with a magnetically non-conductive material, such as a suitable casting resin.

Figure 2:
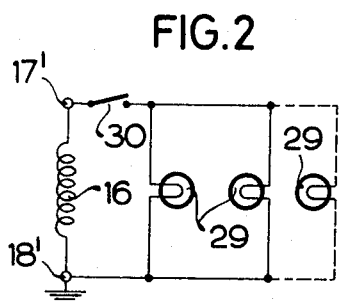
FIG. 2 is a circuit diagram showing the connection between the armature winding and the current-consuming equipment on the vehicle.

The current induced in the armature winding 16 by the magnets 27 is used to furnish power to equipment of the vehicle, such as to the lamps 29, which are controlled by a switch 30 of the lighting system, as shown in FIG. 2. The lighting system, therefore, is connected to the terminals 17' and 18'. A voltage regulator, not shown, can be connected in a known manner between the lighting system and the armature winding 16.

Figure 3:
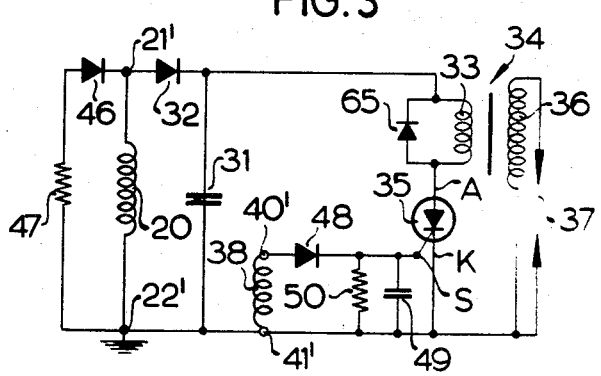
FIG. 3 is an ignition circuit for use with the generator shown in FIG. 1.

The current that the magnets 27 induce in the charge winding 20 is used to charge at least one capacitor 31, as shown in FIG. 3. A unidirectional means, such as the diode 32, is connected in series with the capacitor so that the latter can be charged during one-half of the complete cycle of current induced into the winding 20. The capacitor is shunted by the series connection of a thyristor acting as an electronic switch 35 and the primary winding 33 of a spark coil 34. When the thyristor gate S is provided with a suitable voltage (in the present instance a positive one of sufficient magnitude), the switching path A–K becomes conductive; and the capacitor discharges through the switch 35 and the primary 33, causing a high voltage pulse to appear across the secondary winding 36 of the spark coil 34. The resulting spark appearing between the electrodes of the spark plug 37 ignites the compressed fuel-air mixture in a cylinder of the engine.

The voltage for operating the electronic switch 35 is obtained from a control winding 38 mounted on a yoke-shaped member 39 and having at each of its ends 40 and 41 a terminal 40' and 41', as shown in FIG. 1. The member 39 is located on the stator 11 at its inner circumference. The member extends radially inward towards the hub 24, which consists of a magnetically non-conductive material and contains an auxiliary magnet, a control magnet 42, that is embedded in the material of the hub and moved past the member 39 when the generator is running. By so mounting the control winding 38 it requires very little room, and the construction of its magnetic circuit is inexpensive.

The control winding mounting member 39 is advantageously terminated on each side by a respective recess 43 and 44, which accept the control winding 38. As the control magnet 42 is moved past both its north and south poles sweep over these two recesses and pass by the inner face 45 of the member 39.

A pulse-like voltage is obtained by making the circumferential length 1 of the recess 43 at least approximately as long as the distance between the north and south poles of the magnet 42.

To ensure that the pulse-like voltage appears only in the current direction of rotation n of the engine, the inner face 45 of the member 39 is beveled, so that it diverges from the control magnet 42 as the latter sweeps by. This measure is improved by beveling the stator in the area b next to the recess 44, so that over this area the stator also diverges from the magnet 42.

With the current generator of the invention it is possible during each ignition process to charge the capacitor 31 with a plurality of half waves induced in the winding 20, as a consequence of which the capacitor stores so much energy that even badly fouled spark plugs are certain to produce a spark.

The cost for providing electrical insulation for the generator is reduced by electrically loading the charge winding 20 during both the positive and negative half cycles of the induced voltage. In the embodiment shown in FIG. 3, this is done by providing the one unidirectional means — here the diode 32 —, which permits current to flow to the capacitor 31 only during the half cycle of one polarity, and by shunting the capacitor 31 by a circuit containing at least another unidirectional means — here the diode 46 —, which allows current to flow through it and the winding 20 during the half cycle of opposite polarity. In most cases it is advisable to connect in series with the diode 46 a load resistance 47.

In the circuit of FIG. 3 the control winding 38 is connected by its terminal 40' through a diode 48 that only passes positive going voltages to the thyristor gate S. Its other terminal 41' is connected to the thyristor cathode K. Also connected to the gate and cathode are a capacitor 49 and a resistance 50. The capacitor 49 short circuits the high frequency parasitic oscillations, and the resistance 50 sets the value of the control voltage conducted to the gate S.

Figure 4:
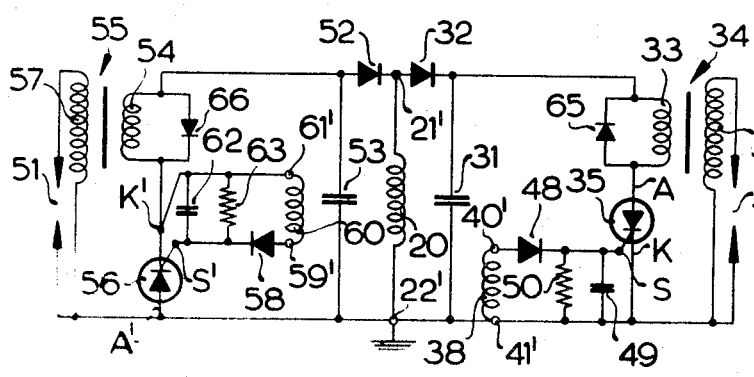
FIG. 4 is a circuit diagram of a second embodiment of an ignition circuit.

As the circuit diagram of FIG. 4 shows, there is another way of loading the charge winding 20 during both the positive and negative half cycles of the voltage induced in it. The circuit to the right of the charge winding will not be described, because it corresponds to the circuit shown in FIG. 3, excepting that the diode 46 and the load resisance 47 have been eliminated. All corresponding components in FIG. 4 therefore have the same reference numerals.

The ignition circuit shown in FIG. 4 is intended for a two cylinder internal combustion engine, of which the compressed fuel-air mixture is ignited in one cylinder by the spark plug 37 and in the other cylinder by the spark plug 51. Consequently, a unidirectional means, such as the diode 32, is connected to pass current between the ignition capacitor 31 and the winding 20 when a voltage of a half cycle of one polarity is induced across the latter; and a second unidirectional means, such as the diode 52, is connected to pass current between the same winding and a second capacitor 53 when a voltage of the half cycle of the other polarity is induced across the winding. There is connected across the second capacitor a series circuit consisting of the primary winding 54 of a spark coil 55 and the switching path A'–K' of an electronic switch 56 comprised by a thyristor. The secondary winding 57 of the spark coil 55 is connected to the spark plug 51. The thyristor has a gate S' that is operated by a control winding 60, of which its terminal 59' is connected to the gate by a diode 58, which conducts only a positive voltage from the winding 60. The other winding terminal 61' is connected to the thyristor cathode K'. The connection between the cathode K' and the gate S' is shunted by a capacitor 62 for shorting out the high-frequency parasitics and by a resistance 63, which determines the value of the control voltage on the gate S'.

The control winding 60 is also mounted in the current generator shown in FIG. 1. The winding is held on a second yoke-like member 64, which differs from the similar member 39 only in that it is spaced on the stator inner circumference 180° from the member 39. The ends of the control winding carrying the connection terminals 59' and 61' are denoted by the reference numerals 59 and 61.

In the circuit shown in FIG. 4, if a spark first appears between the electrodes of the spark plug 37, the spark plug 51 will be caused to spark after the rotor 23 has turned through 180°. In other words, when the control magnet 42 sweeps past the control winding 60, the diode 58 conducts a positive control voltage to the gate S' so that the switching path A'–K' of the electronic switch 56 is turned on, and the capacitor 53 can discharge through the primary winding 54 of the spark coil 55.

Parasitic oscillations in the discharge circuit can be avoided in a known manner by shunting the primary windings 33 and 54 with a respective diode 65 and 66.

In accordance with another embodiment of the invention, the current induced in the charge winding 20 during one-half cycle of the same polarity can be used to charge a single capacitor. To this capacitor are connected a plurality of discharge circuits, each containing the switching path of a respective electronic switch and the primary winding of a spark coil, the secondary of which is connected to a respective spark plug. Each electronic switch is controlled by a respective control winding mounted on the current generator shown in FIG. 1, these windings being spaced along the inner circumference of the stator 11, so that a voltage is induced in them at a respectively different time.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a motor vehicle having an internal combustion engine with at least one spark plug, an electric current generator comprising an annular stator having a first and a second group of radially outwardly extending projections, each of said groups including at least one projection; an engine-driven rotor consisting at least in part of magnetically conductive material and being adjacent to said stator; first and second winding means respectively provided on said first and second groups of projections; a plurality of magnets provided on said rotor and arranged to travel past said winding means in response to rotation of the rotor, alternate magnets having opposite poles adjacent to said winding means whereby currents are induced in said first and second winding means when said rotor moves; capacitor means connected in circuit with one of said first and second winding means to be charged thereby; voltage actuated electronic switch means connected across said capacitor means; spark plug firing spark coil means including primary winding means and secondary winding means arranged to furnish high voltage pulses in response to closing of said switch means, said switch means and said primary winding being connected in series across said capacitor means; means for periodically closing said switch means including control winding means in said stator; auxiliary magnet means rotating with said rotor and arranged to travel past said control winding means to induce a voltage therein for closing said switch means; at least one consumer of electrical energy connectable to the other of said first and second winding means; and radially inwardly extending mounting means provided on said stator for said control winding means, said stator having two spaced recesses for holding said control winding means on respective sides of said mounting means, said recesses facing said auxiliary magnet means and said auxiliary magnet means having two poles whereby each of said last mentioned poles passes by each of said recesses in turn as said auxiliary magnet means travels past said control winding means.

2. The combination as defined in claim 1, wherein that one of said two recesses past which said auxiliary magnet means first travels before passing by said control winding means is at least approximately as long as in the direction of movement of said auxiliary magnet means as the spacing between said two poles of said auxiliary magnet means.

3. The combination as defined in claim 2, wherein said mounting means progressively diverge from said auxiliary magnet means as said auxiliary magnet means moves past said mounting means.

4. The combination as defined in claim 3, wherein the part of said stator immediately adjacent the other one of said recesses in the direction of movement of said auxiliary magnet means progressively diverges from said auxiliary magnet means as said auxiliary magnet means moves past said part of said stator.

5. In a motor vehicle having an internal combustion engine with at least one spark plug, an electric current generator comprising an annular stator and having a first and second group of radially outwardly extending projections each group including at least one projection; an engine-driven rotor consisting at least in part of magnetically conductive material and adjacent to said stator; first and second winding means respectively provided on said first and second groups of projections; a plurality of magnets provided on said rotor and arranged to travel past said winding means in response to rotation of the rotor, alternate magnets having opposite poles adjacent to said winding means, whereby currents are induced in said first and second winding means when the rotor moves; capacitor means connected in circuit with one of said winding means to be charged thereby; voltage actuated electronic switch means connected across said capacitor means; spark plug firing spark coil means including primary winding means and secondary winding means arranged to furnish high voltage pulses in response to closing of said switch means, said switch means and said primary winding means being connected in series across said capacitor means; means for periodically closing said switch means including control winding means in said stator; auxiliary magnet means rotating with said rotor and arranged to travel past said control winding means to induce a voltage therein for closing said switch means; at least one consumer of electrical energy connectable to the other said first and second winding means; and radially inwardly extending mounting means formed by said stator for holding said control winding means, said control winding means being held substantially within said radially inwardly extending mounting means, said auxiliary magnet means passing by said control winding means while held within said mounting means, said radially inwardly extending mounting means protecting said control winding means from accidental access to said control winding means.

6. The combination as defined in claim 5, wherein said stator defines an outer circumference and an inner circumference, said outer circumference having said projections and said inner circumference having said mounting means; and a hub for supporting said rotor for rotation by the engine and consisting of non-magnetically conductive material, said auxiliary magnet means being embedded in said hub.

7. The combination as defined in claim 5, wherein said one winding means and said control winding means are arcuately spaced from each other so that the former charges said capacitor means at least twice before said control winding means closes said switch means.

8. The combination as defined in claim 7, including means for electrically loading said one winding means during both half cycles of a full wave induced within said one winding means.

9. The combination as defined in claim 8, including first unidirectional means connected to permit current to flow between said one winding means and said capacitor means during a half cycle of one polarity; and second unidirectional means connected to said one winding means to permit current to flow through said one winding during the half cycle of the other polarity of a full wave.

10. The combination as defined in claim 8, wherein said capacitor means includes at least one first capacitor and at least one second capacitor, discrete unidirectional means connected to each of said first and second capacitors for permitting charging of said first and second capacitors during respective half cycles of a full wave; and separate ones of said electrical switch means and spark plug firing coil means for each of said first and second capacitors.

11. In a motor vehicle having an internal combustion engine with at least one spark plug, an electric current generator comprising an annular stator and having a first and second group of radially outwardly extending projections each group including at least one projection; an engine-driven rotor consisting at least in part of magnetically conductive material and adjacent to said stator; first and second winding means respectively provided on said first and second groups of projections; a plurality of magnets provided on said rotor and arranged to travel past said winding means in response to rotation of the rotor, alternate magnets having opposite poles adjacent to said winding means, whereby currents are induced in said first and second winding means when the rotor moves; capacitor means connected in circuit with one of said winding means to be charged thereby; voltage actuated electronic switch means connected across said capacitor means spark plug firing spark coil means including primary winding means and secondary winding means arranged to furnish high voltage pulses in response to closing of said switch means, said switch means and said primary winding means being connected in series across said capacitor means; means for periodically closing said switch means including control winding means in said stator; auxiliary magnet means rotating with said rotor and arranged to travel past said control winding means to induce a voltage therein for closing said switch means; at least one consumer of electrical energy connectable to the other of said first and second winding means, said one winding means and said control winding means being arcuately spaced from each other so that the former charges said capacitor means at least twice before said control winding means closes said switching means; means for electrically loading said one winding means during both half cycles of a full wave induced within said one winding means, said capacitor means including at least one first capacitor and at least one second capacitor, discrete unidirectional means connected to each of said first and second capacitors for permitting charging of said first and second capacitors during respective half cycles of a full wave; separate ones of said electrical switching means and spark plug firing coil means for each of said first and second capacitors; and separate ones of said control winding means for each of said first and second capacitors.

12. In a motor vehicle having an internal combustion engine with at least one spark plug, an electric current generator comprising an annular stator and having a first and second group of radially outwardly extending projections each group including at least one projection; an engine-driven rotor consisting at least in part of magnetically conductive material and adjacent to said stator; first and second winding means respectively provided on said first and second groups of projections; a plurality of magnets provided on said rotor and arranged to travel past said winding means in response to rotation of the rotor, alternate magnets having opposite poles adjacent to said winding means, whereby currents are induced in said first and second winding means when the rotor moves; capacitor means connected in circuit with one of said winding means to be charged thereby; voltage actuated electronic switch means connected across said capacitor means; spark plug firing spark coil means including primary winding means and secondary winding means arranged to furnish high voltage pulses in response to closing of said switch means, said switch means and said primary winding means being connected in series across said capacitor means; means for periodically closing said switch means including control winding means in said stator; auxiliary magnet means rotating with said rotor and arranged to travel past said control winding means to induce a voltage therein for closing said switch means; and at least one consumer of electrical energy connectable to the other of said first and second winding means, said capacitor means consisting of a single capacitor and including at least two said spark plug firing coil means, and a separate one of said switch means and means for periodically closing the switch means for each of said spark plug firing coil means, wherein the control winding means are spaced one from the other so that there is induced in them a voltage at non-corresponding times.

13. The combination as defined in claim 9, including resistance means connected in series with said second unidirectional means.

* * * * *